(12) United States Patent
Miranda (10) Patent No.: US 8,103,788 B1
(45) Date of Patent: Jan. 24, 2012

(54) METHOD AND APPARATUS FOR DYNAMICALLY REALLOCATING BUFFERS FOR USE IN A PACKET TRANSMISSION

(75) Inventor: Paul Miranda, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 3050 days.

(21) Appl. No.: 10/299,223

(22) Filed: Nov. 19, 2002

(51) Int. Cl.
*G06F 13/00* (2006.01)

(52) U.S. Cl. ......... 709/234; 709/232; 709/226; 709/224

(58) Field of Classification Search .................. 709/234, 709/232, 226, 224
See application file for complete search history.

(56) References Cited

U.S. PATENT DOCUMENTS

| | | | |
|---|---|---|---|
| 5,528,591 A | 6/1996 | Lauer | |
| 5,592,622 A * | 1/1997 | Isfeld et al. | 709/207 |
| 5,708,974 A * | 1/1998 | Smith | 455/62 |
| 5,838,994 A * | 11/1998 | Valizadeh | 710/56 |
| 6,678,813 B1 * | 1/2004 | Le | 711/172 |
| 2002/0049901 A1 | 4/2002 | Carvey | |

* cited by examiner

*Primary Examiner* — Kenneth R Coulter (74) *Attorney, Agent, or Firm* — Robert C. Kowert; Meyertons, Hood, Kivlin, Kowert & Goetzel, P.C.

(57) ABSTRACT

Various embodiments of systems and methods for dynamically reallocating buffers used in communicating packets in various communication channels are disclosed. In some embodiments, a method may involve transmitting packets in several communication channels dependent on availability of buffers allocated among the communication channels; tracking a history of packet traffic in each of the communication channels; and dynamically reallocating one or more of the buffers dependent on the history.

68 Claims, 7 Drawing Sheets

| Bit Time | 7 | 6 | 5 | 4 | 3 | 2 | 1 | 0 |
|---|---|---|---|---|---|---|---|---|
| 1 | | | CMD[5:0] | | | | | |
| 2 | | | | | | | | |
| 3 | | | | | | | | |
| 4 | | | | | | | | |

| Bit Time | 7 | 6 | 5 | 4 | 3 | 2 | 1 | 0 |
|---|---|---|---|---|---|---|---|---|
| 1 | | | CMD[5:0] | | | | | |
| 2 | Destination | | | | | | | |
| 3 | | | | | | | | |
| 4 | | | | | | | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

| Bit Time | 7 | 6 | 5 | 4 | 3 | 2 | 1 | 0 |
|---|---|---|---|---|---|---|---|---|
| 1 | | | CMD[5:0] ||||||
| 2 | | Destination ||| | | | |
| 3 | ||||||||
| 4 | ||||||||

| Bit Time | 7 | 6 | 5 | 4 | 3 | 2 | 1 | 0 |
|---|---|---|---|---|---|---|---|---|
| 1 | Data[7:0] ||||||||
| 2 | Data[15:8] ||||||||
| 3 | Data[23:16] ||||||||
| 4 | Data[31:24] ||||||||
| 5 | Data[39:32] ||||||||
| 6 | Data[47:40] ||||||||
| 7 | Data[55:48] ||||||||
| 8 | Data[63:56] ||||||||

METHOD AND APPARATUS FOR DYNAMICALLY REALLOCATING BUFFERS FOR USE IN A PACKET TRANSMISSION

BACKGROUND OF THE INVENTION

1. Field of the Invention

This invention relates to computer and network systems and, more particularly, to routing packets within a computer or network system.

2. Description of the Related Art

Generally, personal computers (PCs) and other types of computer systems have been designed around a shared bus system for accessing memory. Thus, one or more processors and one or more input/output (I/O) devices are typically coupled to memory through a shared bus. The I/O devices may be coupled to the shared bus through an I/O bridge that manages the transfer of information between the shared bus and the I/O devices, and processors are typically coupled directly to the shared bus or are coupled through a cache hierarchy to the shared bus.

Unfortunately, shared bus systems may experience several drawbacks. For example, since there are multiple devices attached to the shared bus, the bus is typically operated at a relatively low frequency. The multiple attachments present a high capacitive load to a device driving a signal on the bus, and the multiple attachment points present a relatively complicated transmission line model for high frequencies. Accordingly, the frequency remains low, and thus the bandwidth available on the shared bus is relatively low. The low bandwidth presents a barrier to attaching additional devices to the shared bus, since additional devices may negatively impact performance.

Another disadvantage of the shared bus system is a lack of scalability to larger numbers of devices. As mentioned above, the amount of bandwidth is fixed (and may decrease if adding additional devices reduces the operable frequency of the bus). Once the bandwidth requirements of the devices attached to the bus (either directly or indirectly) exceeds the available bandwidth of the bus, devices will frequently be stalled when attempting access to the bus. As a result, overall performance may be decreased.

One or more of the above problems may be addressed by using a distributed memory system. A computer system employing a distributed memory system includes multiple nodes. Two or more of the nodes are connected to memory, and the nodes are interconnected using any suitable interconnect. For example, each node may be connected to each other node using dedicated communication lines. Alternatively, each node may connect to a fixed number of other nodes, and transactions may be routed from a first node to a second node to which the first node is not directly connected via one or more intermediate nodes. The memory address space is assigned across the memories in each node.

Generally, a "node" is a device which is capable of participating in transactions upon the interconnect. For example, in a packet-based interconnect the node may be configured to receive and transmit packets to other nodes. One or more packets may be employed to perform a particular transaction. A particular node may be a destination for a packet, in which case the information is accepted by the node and processed internally in the node. Alternatively, the particular node may be used to relay a packet from a source node to a destination node if the particular node is not the destination node of the packet.

Distributed memory systems present design challenges that differ from the challenges in shared bus systems. For example, shared bus systems regulate the initiation of transactions through bus arbitration. Accordingly, a fair arbitration algorithm allows each bus participant the opportunity to initiate transactions. The order of transactions on the bus may represent the order that transactions are performed (e.g., for coherency purposes). On the other hand, in distributed memory systems, nodes may initiate transactions concurrently and use the interconnect to transmit the transactions to other nodes. These transactions may have logical conflicts between them (e.g., coherency conflicts for transactions to the same address) and may experience resource conflicts (e.g., buffer space may not be available in various nodes) since no central mechanism for regulating the initiation of transactions is provided. Accordingly, it is more difficult to ensure that information continues to propagate among the nodes smoothly and that deadlock situations (in which no transactions are completed due to conflicts between the transactions) are avoided.

By employing virtual channels and allocating different resources to the virtual channels, conflicts may be reduced. A "virtual channel" is a communication path for initiating transactions (e.g., by transmitting packets containing commands) between various processing nodes. Each virtual channel may be resource-independent of the other virtual channels (i.e., packets flowing in one virtual channel are generally not affected, in terms of physical transmission, by the presence or absence of packets in another virtual channel). Packets that do not have logical/protocol-related conflicts may be grouped into a virtual channel. For example, packets may be assigned to a virtual channel based upon packet type. Packets in the same virtual channel may physically conflict with each other's transmission (i.e., packets in the same virtual channel may experience resource conflicts), but may not physically conflict with the transmission of packets in a different virtual channel (by virtue of the virtual channels being resource-independent of each other). Accordingly, logical conflicts occur between packets in separate virtual channels. Since packets that may experience resource conflicts do not experience logical conflicts and packets which may experience logical conflicts do not experience resource conflicts, deadlock-free operation may be achieved.

One problem that may arise in a packet-based system occurs when buffers are used to temporarily store packets received by a node before outputting the packets from the node. Typically, packets are allocated to each of the node's interfaces and each of the virtual channels. However, each interface's and each virtual channel's usage of the buffers may vary over time. Thus, certain interfaces and/or virtual channels may experience less than optimal performance at times when those interfaces and virtual channels are experiencing heavy traffic. Likewise, buffer capacity may be underutilized if traffic is relatively low for other interfaces and virtual channels. Accordingly, it is desirable to be able to more efficiently utilize buffers within a node.

SUMMARY

Various embodiments of systems and methods for dynamically reallocating buffers used in communicating packets in various communication channels are disclosed. In one embodiment, an apparatus may include several interfaces that are each configured to transmit packets via several communication channels. The apparatus may also include several buffers coupled to the interfaces and configured to temporarily store the packets (e.g., after being received by an input interface and prior to being sent via one or more output interfaces). The buffers are allocated among the communication channels. A buffer allocation unit is coupled to the interfaces and configured to generate history data indicative of relative traffic experienced in each of the communication channels. The buffer allocation unit is configured to dynamically reallocate the buffers (e.g., by reallocating some buffers previously allocated to one communication to another communication channel) in response to the history data.

In some embodiments, a method may involve transmitting packets in several communication channels dependent on availability of buffers allocated among the communication channels; tracking a history of packet traffic in each of the communication channels; and dynamically reallocating one or more of the buffers dependent on the history.

In one embodiment, a first node may transmit packets in various communication channels to a second node dependent on availability of buffers included in the second node. At the time the first node transmits a packet in a given communication channel, a buffer within the second node is already allocated to that communication channel. The second node may dynamically reallocate one or more of its buffers (e.g., a buffer may be reallocated to one communication channel from another communication channel). The second node's dynamic reallocation is performed independently of the second node receiving a packet from the first node.

BRIEF DESCRIPTION OF THE DRAWINGS

A better understanding of the present invention can be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Exemplary System Overview

Before providing a more detailed discussion of how buffers within a node may be dynamically reassigned to different virtual channels, a discussion of an exemplary system that may use such a dynamic buffer allocation scheme is provided.

Figure 1:
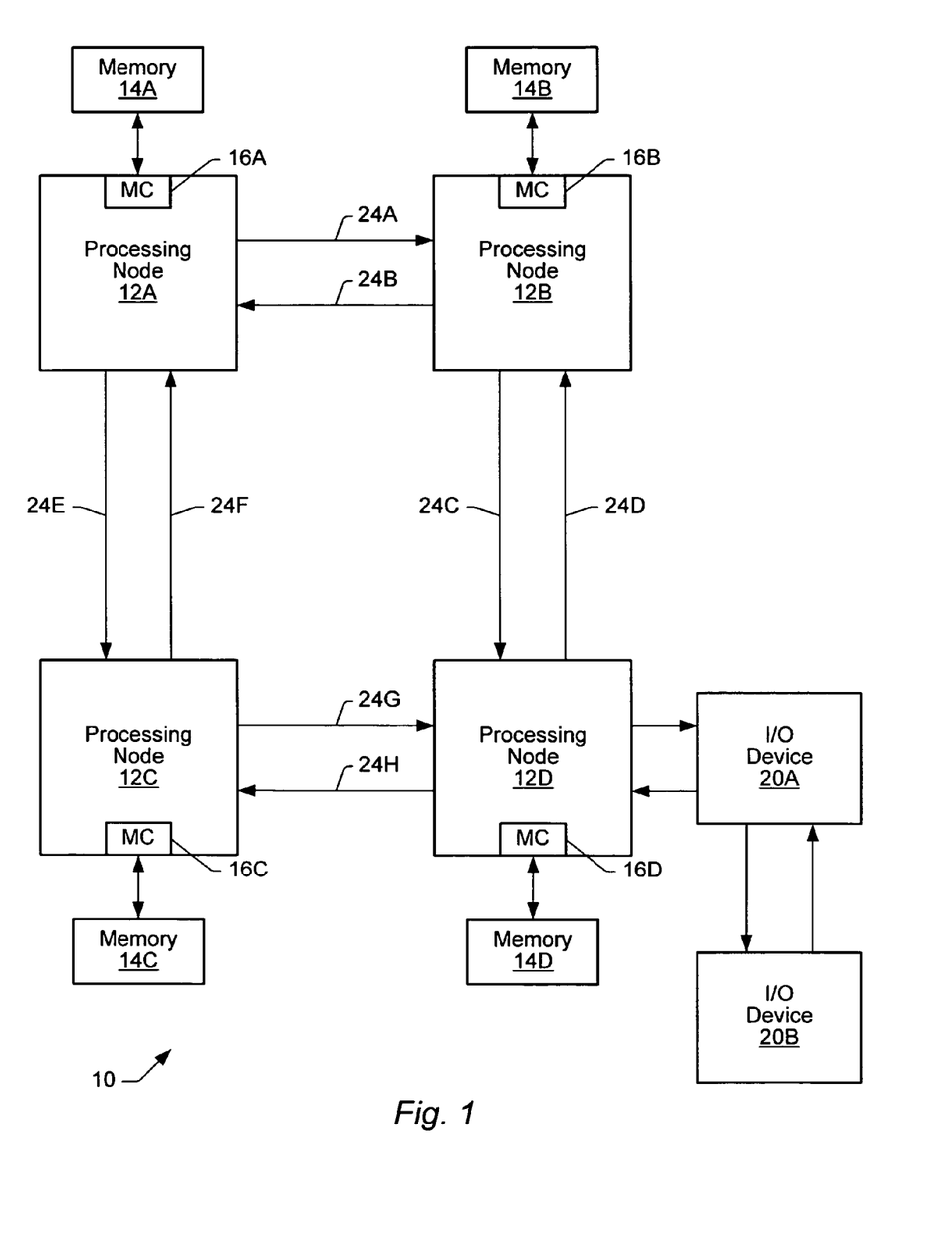
FIG. 1 is a block diagram of one embodiment of a computer system.

Turning now to FIG. 1, one embodiment of a computer system 10 is shown. Other embodiments are possible and contemplated. In the embodiment of FIG. 1, computer system 10 includes several processing nodes 12A, 12B, 12C, and 12D. Each processing node may be coupled to a respective memory 14A-14D via a memory controller 16A-16D included within each respective processing node 12A-12D. Additionally, processing nodes 12A-12D include interface logic used to communicate between the processing nodes 12A-12D. For example, processing node 12A may include interface logic for communicating with processing node 12B, processing node 12C, and yet another processing node (not shown). Processing nodes 12B, 12C, and 12D may include similar interface logic. Processing node 12D may be coupled to communicate with an input/output (I/O) device 20A via interface logic, and I/O device 20A may be further coupled to a second I/O device 20B. Other processing nodes may communicate with other I/O devices in a similar fashion. Alternatively, a processing node may communicate with an I/O bridge that is coupled to an I/O bus.

Processing nodes 12A-12D use a packet-based link for inter-processing node communication. The packet-based link may be implemented using the HyperTransport™ technology in some embodiments. In the present embodiment, the link is implemented as sets of unidirectional lines (e.g., lines 24A are used to transmit packets from processing node 12A to processing node 12B and lines 24B are used to transmit packets from processing node 12B to processing node 12A). Other sets of lines 24C-24H may be used to transmit packets between other processing nodes, as illustrated in FIG. 1. The link may be operated in a cache coherent fashion for communication between processing nodes or in a non-coherent fashion as a daisy-chain structure between I/O devices 20A-20B (and additional I/O devices, as desired). It is noted that a packet to be transmitted from one processing node to another may pass through one or more intermediate nodes. For example, a packet transmitted by processing node 12A to processing node 12D may pass through either processing node 12B or processing node 12C, as shown in FIG. 1. Any suitable routing algorithm may be used to effect the desired routing between nodes. Other embodiments of computer system 10 may include more or fewer processing nodes than the embodiment shown in FIG. 1.

All or some of processing nodes 12A-12D may include one or more processors. Broadly speaking, a processing node may include a processor and a memory controller for communicating with a memory and other logic as desired. As used herein, a "node" is a device that is capable of participating in transactions upon the packet-based link.

Memories 14A-14D may include any suitable memory devices. For example, a memory 14A-14D may include one or more RAMBUS DRAMs (RDRAMs), synchronous DRAMs (SDRAMs), DRAM, static RAM, etc. The address space of computer system 10 is divided among memories 14A-14D. Each processing node 12A-12D may include a memory map used to determine which addresses are mapped to which memories 14A-14D, and hence to which processing node 12A-12D a memory request for a particular address is to be routed. In one embodiment, the coherency point for an address within computer system 10 is the memory controller 16A-16D coupled to the memory storing bytes corresponding to the address. Memory controllers 16A-16D may include control circuitry for interfacing to memories 14A-14D. Additionally, memory controllers 16A-16D may include request queues for queuing memory requests.

Generally, the interface logic of each node may include buffers for receiving packets from the link and for buffering packets to be transmitted upon the link. Computer system 10 may employ any suitable flow control mechanism for transmitting packets. For example, in one embodiment, each node stores a count of the number of each type of buffer within the receiver at the other end of each link to which the node is connected. The node does not transmit a packet unless the receiving node has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 20A-20B are illustrative of any desired peripheral devices. For example, I/O devices 20A-20B may include network interface cards, video accelerators, audio cards, hard or floppy disk drives or drive controllers, SCSI (Small Computer Systems Interface) adapters and telephony cards, modems, sound cards, and a variety of data acquisition cards such as GPM (General Purpose Interface Bus) or field bus interface cards.

Figure 2:
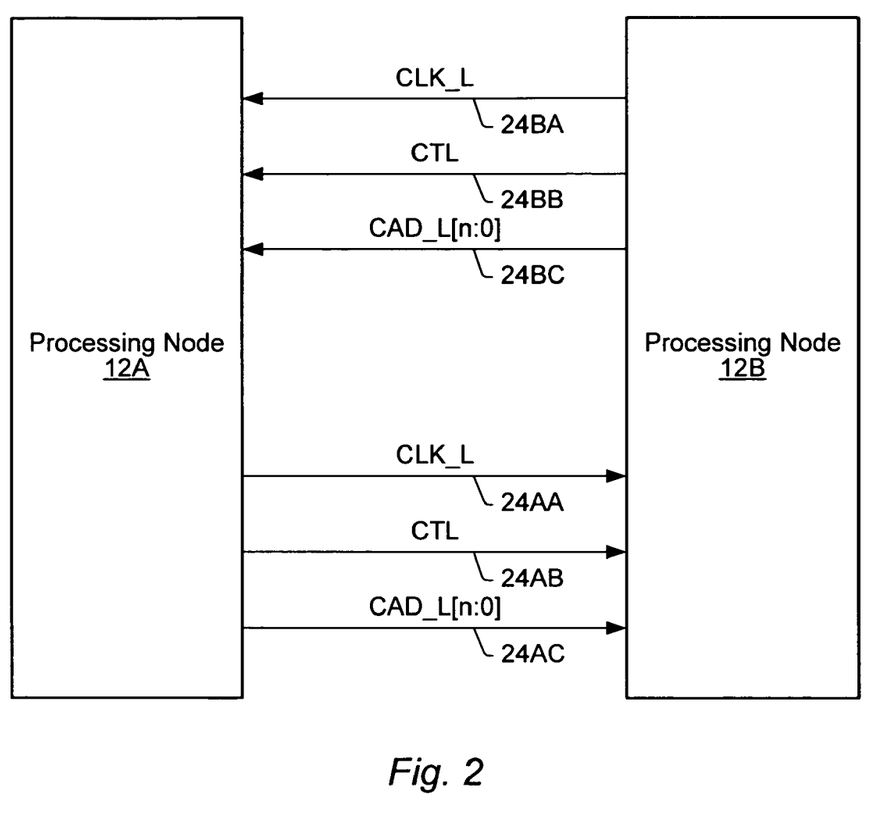
FIG. 2 is a block diagram of a pair of nodes shown in FIG. 1, highlighting the interconnection therebetween according to one embodiment.

In FIG. 2, a block diagram of processing nodes 12A and 12B illustrates one embodiment of the links in more detail. Other embodiments are possible and contemplated. In the embodiment of FIG. 2, lines 24A include a clock line 24AA, a control line 24AB, and a control/address/data bus 24AC. Similarly, lines 24B include a clock line 24BA, a control line 24BB, and a control/address/data bus 24BC.

The clock line may transmit a clock signal that indicates a sample point for the control line and the control/address/data bus. In one particular embodiment, data/control bits may be transmitted on each edge (i.e., rising edge and falling edge) of the clock signal. Accordingly, two data bits per line may be transmitted per clock cycle. The amount of time employed to transmit one bit per line is referred to herein as a "bit time." The above-mentioned embodiment may include two bit times per clock cycle. A packet may be transmitted across two or more bit times. Multiple clock lines may be used depending upon the width of the control/address/data bus. For example, two clock lines may be used for a 16-bit control/address/data bus (with one half of the control/address/data bus referenced to one of the clock lines and the other half of the control/address/data bus and the control line referenced to the other clock line).

The control line indicates whether the data transmitted upon the control/address/data bus is a bit time of a command packet or a bit time of a data packet. The control line may be asserted to indicate a bit time of a command packet and deasserted to indicate a bit time of a data packet. Certain command packets may indicate that a data packet follows. The data packet may immediately follow the corresponding command packet. In one embodiment, other command packets may interrupt the transmission of a data packet. Such an interruption may be performed by asserting the control line for a number of bit times during transmission of the data packet and transmitting the bit times of the command packet while the control line is asserted. In one embodiment, only command packets that do not indicate that a data packet will be following may interrupt a data packet. Additionally, in one embodiment, the control line may be deasserted during transmission of a command packet to indicate stall bit times. A subsequent reassertion of the control line may indicate that the command packet is continuing.

The control/address/data bus includes a set of lines for transmitting the data/control bits. In one embodiment, the control/address/data bus may include 8, 16, or 32 lines. Each processing node or I/O bridge may employ any one of the supported numbers of lines. Other embodiments may support other sizes of control/address/data bus as desired.

According to one embodiment, the command/address/data bus lines and the clock line may carry inverted data (i.e., a logical one is represented as a low voltage on the line, and a logical zero is represented as a high voltage). Alternatively, lines may carry non-inverted data (in which a logical one is represented as a high voltage on the line, and logical zero is represented as a low voltage).

Figure 3:
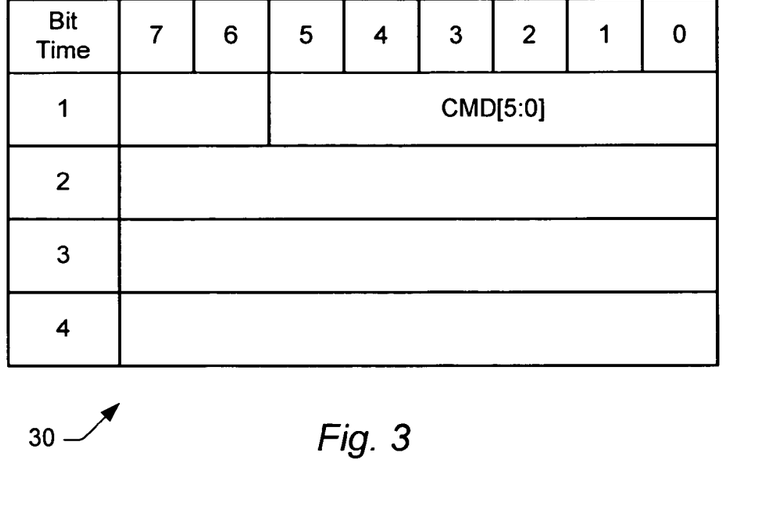
FIG. 3 is a block diagram of an information packet, according to one embodiment.
Figure 4:
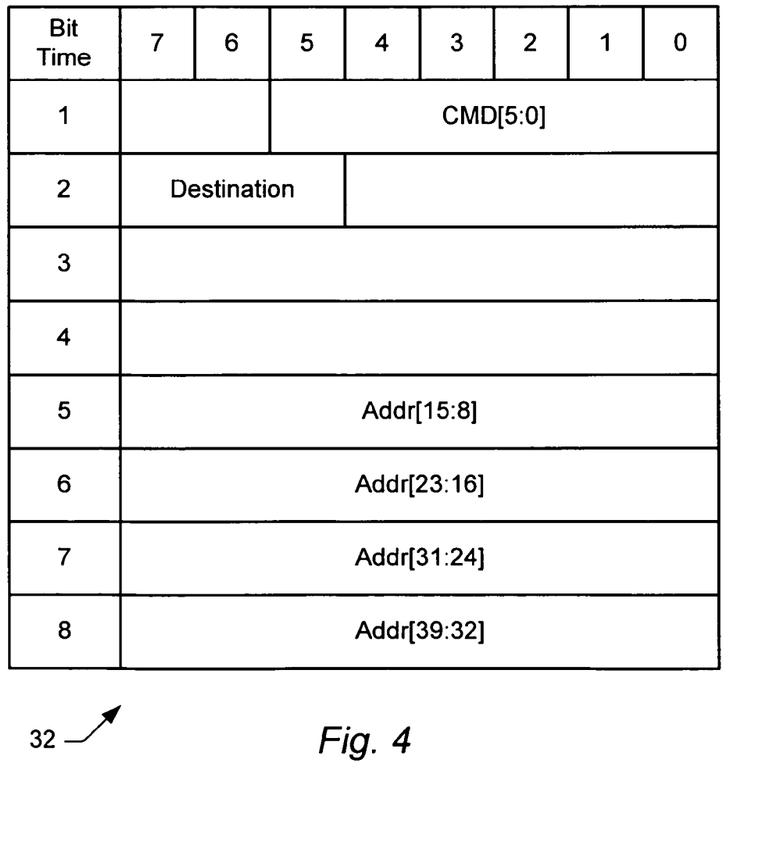
FIG. 4 is a block diagram of a command packet, according to one embodiment.
Figure 5:
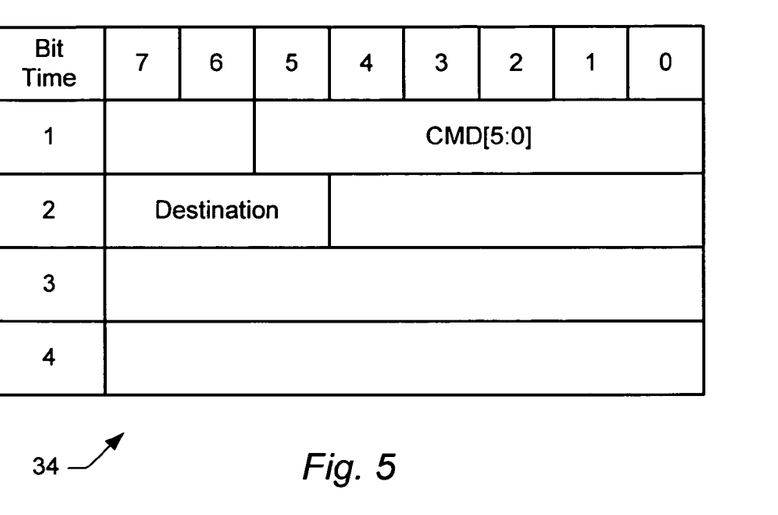
FIG. 5 is a block diagram of a response packet, according to one embodiment.
Figure 6:
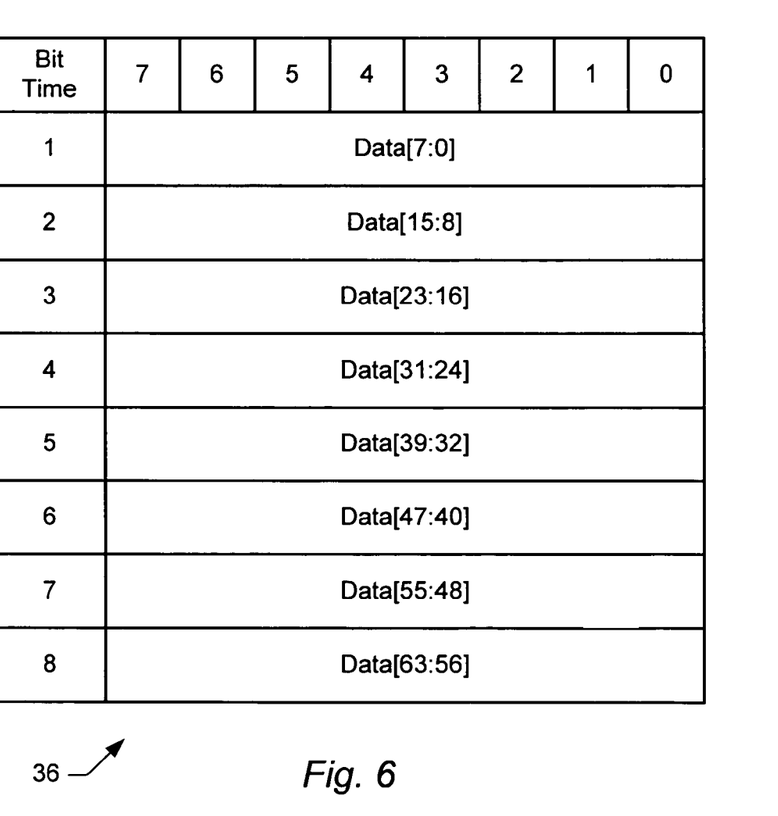
FIG. 6 is a block diagram of a data packet, according to one embodiment.

Turning now to FIGS. 3-6, exemplary packets employed in one embodiment of system 10 are shown. FIGS. 3-5 illustrate command packets and FIG. 6 illustrates a data packet. Other embodiments may employ different packet definitions, as desired. Each of the packets is illustrated as a series of bit times enumerated under the "bit time" heading. The bit times of the packet are transmitted according to the bit time order listed. FIGS. 3-6 illustrate packets for an eight-bit control/address/data bus implementation. Accordingly, each bit time includes eight bits numbered seven through zero. Bits for which no value is provided in the figures either may be reserved for a given packet, or may be used to transmit packet-specific information. Fields indicated by dotted lines indicate optional fields that may not be included in all of the packets of a certain type.

Generally, a packet is a communication between two nodes (an initiating node which transmits the packet and a destination node which receives the packet). The initiating node and the destination node may differ from the source and target node of the transaction of which the packet is a part, or either node may be either the source node or the target node. A command packet is a packet carrying command information regarding the transaction. Certain command packets may specify that a data packet follows. The data packet carries data corresponding to the transaction and corresponding to the specifying command packet.

FIG. 3 illustrates an information packet (info packet) 30. Info packet 30 includes four bit times on an eight-bit link. In the illustrated embodiment, the command encoding is transmitted during bit time one and includes six bits. Each of the other command packets shown in FIGS. 4 and 5 include the command encoding in the same bit positions during bit time 1. Info packet 30 may be used to transmit messages between processing nodes when the messages do not include a memory address. Additionally, info packets may be used to transmit buffer-free counts in embodiments using a coupon-based flow control scheme.

FIG. 4 illustrates one embodiment of a request packet 32. Request packet 32 includes eight bit times on an eight-bit link. The command encoding is transmitted during bit time 1. The destination(s) of the packet may be identified in encoded information transmitted during bit time 2. Bit times five through eight are used transmit the most significant bits of the memory address affected by the transaction. Request packet 32 may be used to initiate a transaction (e.g. a read or write transaction), as well as to transmit requests in the process of carrying out the transaction for those commands that carry the memory address affected by the transaction. Generally, a request packet indicates an operation to be performed by the destination.

Some of the undefined fields in packet 32 may be used in various request packets to carry packet-specific information. Furthermore, bit time 4 may be used in some requests to transmit the least significant bits of the memory address affected by the transaction.

FIG. 5 illustrates one embodiment of a response packet 34. Response packet 34 includes the command encoding and a destination. Various types of response packets may include additional information. For example, a read response packet may indicate the amount of read data provided in a following data packet. Generally, response packet 34 is used for commands that do not require transmission of the memory address affected by the transaction. Furthermore, response packet 34 may be used to transmit positive acknowledgement packets to terminate a transaction.

FIG. 6 illustrates one embodiment of a data packet 36. Data packet 36 includes eight bit times on an eight-bit link in the embodiment of FIG. 6. Data packet 36 may include different numbers of bit times dependent upon the amount of data being transferred. For example, in one embodiment, a block includes 64 bytes and hence 64 bit times on an eight-bit link. Other embodiments may define a block to be of a different size, as desired. Additionally, data may be transmitted in less than block sizes for non-cacheable reads and writes. Data packets for transmitting data less than block size employ fewer bit times. In one embodiment, non-block sized data packets may transmit several bit times of byte enables prior to transmitting the data to indicate which data bytes are valid within the data packet. Furthermore, block data may be returned with the quadword addressed by the least significant bits of the request address first, followed by interleaved return of the remaining quadwords. A quadword may include 8 bytes in one embodiment.

FIGS. 3-6 illustrate packets for an eight-bit link. Packets for 16 and 32 bit links may be formed by concatenating consecutive bit times illustrated in FIGS. 3-6. For example, bit time one of a packet on a 16-bit link may include the information transmitted during bit times one and two on the eight-bit link. Similarly, bit time one of the packet on a 32-bit link may include the information transmitted during bit times one through four on the eight-bit link. Formulas 1 and 2 below illustrate the formation of bit time one of a 16-bit link and bit time one of a 32-bit link according to bit times from an eight-bit link.

$$BT1_{16}[15:0]=BT2_8[7:0]\|BT1_8[7:0] \quad (1)$$

$$BT1_{32}[31:0]=BT4_8[7:0]\|BT3_8[7:0]\|BT2_8[7:0]\|BT1_8[7:0] \quad (2)$$

Packets that may experience logical conflicts (e.g., for protocol reasons or coherency reasons) may be assigned to different virtual channels based on packet type. The transmission medium may be implemented so that the virtual channels do not experience physical conflicts with each other. It is noted that in some embodiments, packets from different virtual channels may be transmitted over the same physical links (e.g., lines 24 in FIG. 1).

If packets of the same type are unlikely to experience logical conflicts with each other, each packet may be assigned to a virtual channel based upon its command encoding. In one embodiment, packets may be assigned to one of four different virtual channels: broadcasts, requests, responses, and posted requests. The broadcast virtual channel includes packets that are sent to multiple destinations (e.g., as part of a transaction, probe packets may be sent to each node in the system in order to maintain cache coherency). Request packets include commands such as read or write commands that are not posted (i.e., the recipient of a request generates a response). Response packets include responses to request packets. Posted requests differ from non-posted requests in that recipients of posted requests may not generate responses (e.g., issuers of posted requests may not expect a response from the recipient of a posted request). For example, posted requests may be used in systems that support PCI (Peripheral Component Interconnect) posted writes. In general, requests cause responses and broadcasts to be issued in order to service the request and to indicate to the requestor (for non-posted requests) that the request is complete. Responses may also return any data associated with the request.

Some types of packets (such as the information packet illustrated in FIG. 3) are not routed once they are received. Since these types of packets are not routed, some embodiments may implement a simplified routing system by not assigning these types of packets to a virtual channel. However, in such embodiments, these unassigned packets may still be transmitted over the same physical transmission medium as the other packets that have been assigned a virtual channel.

For simplicity, the four virtual channel embodiment described above will be referred to in most of the following description and examples. However, it is noted that other embodiments may choose different numbers and/or groupings of virtual channels, as desired. For example, one embodiment may not support posted requests. That embodiment may have three virtual channels (broadcasts, requests, and responses) instead of four. Other embodiments may have more than four virtual channels.

In order to avoid deadlock, the virtual channels may be structured to avoid resource conflicts with each other (i.e., one virtual channel may not be allowed to block another). For example, the request virtual channel may become blocked if a constant stream of requests all need to be transmitted to a full request queue in a memory controller. In order to service the entry at the head of the request queue, and thus free up room to accept a new request, the memory controller may need to be able to transmit responses and probes. Accordingly, to avoid deadlock, the stalled request virtual channel may not be able to block the response and/or broadcast virtual channels.

Buffer Allocation

In a distributed memory computing system such as the one described above, packets are routed both between and within nodes. A flow control scheme may handle routing between individual nodes. For example, in a coupon-based flow control scheme, the transmitting node may maintain a count of available buffers in the receiving node for each virtual channel. Whenever the receiving node indicates that it has freed or used a buffer used for a particular virtual channel, the sending node may update the current buffer count. Whenever the buffer count indicates that all of the available buffers are filled, the transmitting node may stop sending packets in order to avoid overrunning the buffers in the receiving node. In other embodiments, other flow control schemes may be implemented. For example, each receiving node may be configured to assert a flow control signal or set a flow control bit in a packet sent to the sending node once the receiving node has filled a certain number of buffers (e.g., a maximum number of buffers). The receiving node may deassert the flow control signal or reset the flow control bit in another packet sent to the sending node when a certain number of buffers at the receiving node are freed. A flow control scheme may operate independently for different virtual channels.

As buffers are freed within a node, the node may dynamically reallocate the freed buffers to different virtual channels. In order to determine how to reallocate buffers (or whether any reallocation is needed), each node may maintain data indicative of the packet traffic experienced within each virtual channel. This data is referred to herein as a history.

Figure 7:
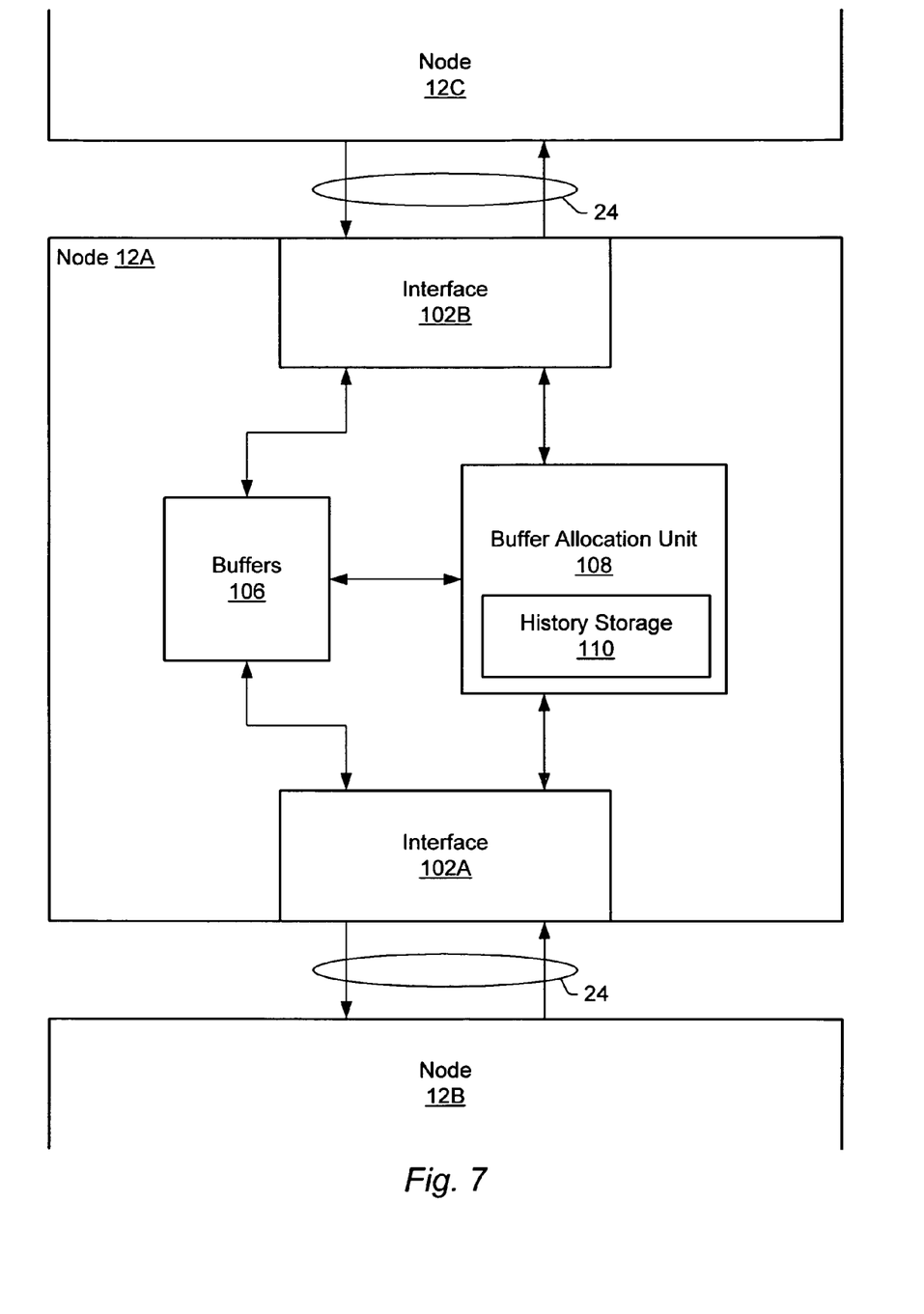
FIG. 7 illustrates a node, according to one embodiment.

FIG. 7 shows one embodiment of system 10 that includes a node 12A coupled to two other nodes 12B and 12C by an interconnect 24. Note that the actual physical arrangement of the interfaces and interconnections within a node 12A may be significantly different than the logical interconnections shown in FIG. 7. Node 12A is configured to dynamically reallocate buffers between virtual channels based on traffic history. Node 12A includes two interfaces, one for communicating with node 12B and another for communicating with node 12C. Each interface is coupled to a respective set of lines within the packet-based link. Each set of lines may support communications in both directions, allowing node 12A to both send and receive packets from nodes 12B and 12C.

Upon receiving a packet from another node (or, for interfaces that communicate with internal components, upon receiving a packet from the component), the interface 102 may store that packet in one of the buffers 106. Packets (e.g., info packets) that are not routed to another interface within the node may not be stored in the buffers. For example, if an info packet containing an updated buffer count (for the node or component with which the interface 102 communicates) is received by the interface 102, the interface 102 may extract the updated buffer count and modify an internal buffer count instead of storing the info packet in one of the buffers 106.

Buffers may be allocated between interfaces 102. The buffers allocated to each interface may be further allocated to each virtual channel. Packets received via interface 102A from node 12B for communication to a recipient component (not shown) included within node 12A or for communication to another node (e.g., node 12C) may be stored within buffers 106 allocated to interface 102A. Packets may be removed from buffers allocated to interface 102A when the packets are output to interface 102B and/or to a recipient component (e.g., a processor, memory controller, or other device) included within node 12A. Similarly, packets received via interface 102B from node 12C may be stored within buffers 106 allocated to interface 102B. As used herein, a buffer is "used" when that buffer is storing a packet received via a particular interface, before that packet is communicated to all of its destination interfaces (e.g., interfaces to another node and/or interfaces to components included in that buffer's node). Likewise, a buffer is "freed" when a packet stored in that buffer is communicated to all of its destination interfaces. Packets may only be stored into free buffers and removed from used buffers. Packets received in a particular virtual channel via a particular interface may only be stored in buffers allocated to that interface and that virtual channel.

In embodiments using a coupon-based flow control scheme, a packet may not be sent to interface 102A from node 12B until interface 102A has sent an info packet indicating the presence of a free buffer that is allocated to the particular virtual channel in which the packet is to be sent. In other embodiments, interface 102A may assert flow control for a particular virtual channel (e.g., by asserting a flow control line or by setting a flow control bit in a packet being sent to a sending node or component) if the number of free buffers allocated to that interface for that virtual channel are less than and/or equal to a prespecified minimum number of buffers. Interface 102A is an example of a means for transmitting packets in several communication channels dependent on availability of buffers allocated among the communication channels.

Node 12A includes a buffer allocation unit 108 that is configured to dynamically reallocate buffers 106 between the virtual channels during operation of node 12A. When power is initially provided to node 12A, each virtual channel at each interface 102 may be allocated a prespecified number of buffers 106. The initial number of buffers allocated to each virtual channel at each interface may be a minimum number (e.g., one buffer) needed to implement the packet-based link in some embodiments. Alternatively, the initial number of buffers may be selected based on the anticipated packet traffic that will be generated by and/or received by node 12A. Buffer allocation unit 108 is an example of a means for dynamically reallocating one or more of the plurality of buffers dependent on history data stored in history storage 110.

Buffers may be allocated to a particular virtual channel in several different ways. For example, in one embodiment, each buffer may have an associated allocation register. The value stored in an allocation register may identify the interface and virtual channel, if any, to which an associated buffer is allocated. Depending on the number of interfaces and virtual channels, information identifying the virtual channel and/or interface may be stored in either an encoded or decoded form. In another embodiment, each interface may have an associated buffer allocation register for each virtual channel. The buffer allocation register may include a bit for each buffer. The bit associated with a particular buffer may be set to indicate that the buffer is currently allocated to that interface for that virtual channel. In embodiments such as these, buffers may be reallocated to different virtual channels and/or different interfaces by updating the values stored in the appropriate allocation registers.

As packets are sent and received at each interface, buffer allocation unit 108 may generate data indicative of the packet traffic in each virtual channel and store this data in history storage 110. Exemplary techniques for generating the history data are described in more detail below. At various points during operation of node 12A, buffer allocation unit 108 may access the history data stored in history storage 110 and determine whether to modify the current buffer allocation for the virtual channels. History storage 110 is an example of a means for tracking a history of packet traffic in each of several communication channels.

In one embodiment, history storage 110 may store several counts (e.g., in several counters, registers, RAM storage locations). When the node 12A is initially powered on, the buffer allocation unit 108 may reset each count to zero (or to another initial value). Buffer allocation unit 108 may generate history data by incrementing a count associated with a particular virtual channel and a particular interface each time a packet is transmitted in a particular virtual channel at that interface. For example, the count may be incremented each time that interface receives a packet in that particular virtual channel. Alternatively, the count may be incremented each time that interface sends a packet in that virtual channel. Thus, in some embodiments, the history storage 110 may include storage for N*M counts, where N is the number of interfaces 102 included in node 12A and M is the number of virtual channels in which packets may be transmitted. N may equal the number of nodes with which node 12A communicates (e.g., two in the illustrated embodiment) plus the number of components included in node 12A that have independent interfaces. Note that in other embodiments, the history storage may include storage for M counts, and thus the counts may track relative traffic among virtual channels but not relative traffic among interfaces 102.

In one embodiment, the counts of packets received in a particular virtual channel at each interface may be compared to determine whether to reallocate buffers among virtual channels and/or interfaces based on the relative traffic recorded in the history storage 110. For example, if the count for a request virtual channel at interface 102A is equal to 15 and the count for the broadcast virtual channel at interface 102A is 35, the buffer allocation unit 108 may reallocate a free buffer formerly allocated to the request virtual channel to the broadcast virtual channel.

In one embodiment, whenever one count reaches a maximum value (e.g., as determined by a number of bits available to store the count), all of the counts may be reset. In other embodiments, a total packet count may track the total number of packets, in all virtual channels, transmitted by a particular node or interface. Both the individual counts and the total packet count may be reset when the total packet count reaches its maximum value. Before a particular count is reset, its value may be captured and used to determine whether to reallocate buffers and/or stored for future use.

In some embodiments, the buffer allocation unit 108 may be configured to maintain a total packet count indicative of the total number of packets received by the node 12A in addition to maintaining counts for each virtual channel and/or interface. The count for the total number of packets may be reset to a minimum value (e.g., zero) when node 12A is powered on. Each time one of the interfaces 102 receives a packet, either from another node or from a component included in the node, the buffer allocation unit 108 may increment this total count in history storage 110. The total packet count may have a maximum value, and when the total packet count equals (or, alternatively, exceeds) this maximum value, the buffer allocation unit 108 may freeze all of the other counts, which are each associated with an individual virtual channel and an individual interface. The relative magnitudes of the values of the individual counts may be compared to determine the relative traffic at each interface in each virtual channel. When the total packet count reaches the maximum value, the individual counts for each interface and/or virtual channel may be saved and/or added to another set of values and the individual counts may be reset.

In one embodiment, the maximum value of the total packet count may be selected to equal the maximum number of buffers that may be reallocated. For example, assume that a minimum of one buffer is always allocated to each virtual channel at each interface, and that a node includes four interfaces, each of which handle traffic in four virtual channels. If that node has 32 buffers, up to 16 buffers (32—the minimum number of buffers (16) that should always be allocated) may be available to be reallocated between the various interfaces and virtual channels at any particular time. Note that at some reallocation times, fewer buffers may be available for reallocation if more than the minimum number (16 in this example) of buffers is currently in use. In such embodiments, when the total packet count reaches the maximum value of the total packet count, the values of the individual packet counts may be frozen. Each of the individual values may indicate the relative packet traffic in a particular virtual channel at a particular interface. For example, if there are four interfaces and four virtual channels, there may be 16 packet counts, each recording the traffic at a respective interface in a respective virtual channel. The individual count values may indicate the number of allocable buffers that, if available, should be allocated to the respective virtual channel and interface. For example, if an individual count has a value of four when the total packet count becomes equal to the maximum packet count, the individual count may indicate that up to four packets may be reallocated to the virtual channel and interface to which the individual count corresponds.

After the individual packet counts are frozen, the individual packet counts may be reset (e.g., to zero). In embodiments where packets may be reallocated between times at which the individual packet counts are frozen, the frozen count values may be stored for use at each interim reallocation time. Alternatively, the captured individual counts may be added to a respective running total counts. Each time an individual count is added to the running total counts, an averaging count may be incremented. The individual running total counts may be divided by the averaging count in order to generate an average traffic for each virtual channel at each interface. The average traffic in each virtual channel may be used to determine how many packets to allocate to each virtual channel at each reallocation time. Alternatively, the current individual packet counts may be compared to the average traffic in order to determine how much the most recent traffic in each virtual channel at each interface varies from the average traffic for that virtual channel at that interface. Reallocation may be based on this amount of variation.

In yet another embodiment, two counts may be maintained for each individual virtual channel at each interface. Additionally, a total packet count may track the total number of packets sent in all virtual channels. One of the individual virtual channel counts may be updated as packets are received in a respective virtual channel to indicate the current traffic occurring in that virtual channel. When the total packet count becomes equal to the maximum total packet count, the value of the current individual virtual channel count may be captured and stored in the second set of registers, which store a "most recent" count. Thus, there may be registers to store current individual packet counts and the most recent individual packet counts. Each time buffers are reallocated, the current counts (if complete, as may be indicated by the total count reaching a maximum value) may be compared to the most recent counts to determine whether buffers should be reallocated based on changes in traffic in one or more virtual channels at one or more interfaces relative to changes in other virtual channels at other interfaces.

In another embodiment, each of the counts associated with an individual virtual channel at an individual interface may have a maximum value (e.g., determined by the number of bits available to track each individual count). If one of the individual counts reaches (or, in some embodiments, exceeds) the maximum value, the buffer allocation unit may capture the current value of the total packet count (the current value may account for the most recently received packet, which caused the individual count to be greater than or equal to the maximum count) and the values of each of the individual packet counts. The total packet count may be used as the denominator of a ratio. The count for each virtual channel at each interface may be used as the numerator of the ratio for an associated virtual channel and interface. The ratios may be compared each reallocation time to determine how many buffers to allocate to each virtual channel at each interface.

In yet other embodiments, history data may be generated by comparing the number of unused buffers allocated to each virtual channel and/or interface at each reallocation time. The virtual channel with the fewest number of unused buffers may be identified as the virtual channel with the greatest need for more buffers in such an embodiment. Alternatively, the percentage utilization (a ratio of the number of unused buffers to the number of used buffers) of the buffers allocated to each virtual channel and/or interface may be compared to each other virtual channel and/or interface to generate the history data. The virtual channel and/or interface with the highest percentage utilization may be identified as the virtual channel with the greatest need for more buffers. Note that in embodiments that generate history data based on buffer availability and/or utilization, history data may not be stored or may only temporarily be stored.

Thus, the above examples show various ways in which history data may be generated. Note that other embodiments may generate history data in other ways. In many embodiments, history data may be generated based on the amount of packet traffic experienced in each virtual channel at each interface during a particular time period. However, other embodiments may generate history data in other ways (e.g., by tracking packet traffic in each virtual channel at all of the node's interfaces or by tracking packet traffic in all virtual channels at each interface). In general, history data is generated based on prior traffic, as indicated by counts or current buffer usage. History data thus provides a prediction of future traffic. History data is not based on actual indications of incoming traffic. For example, buffers in an upstream device are not dynamically reallocated to a particular virtual channel in response to a downstream device sending a packet in that virtual channel to the upstream device.

In one embodiment, the buffer allocation unit 108 may determine whether to reallocate buffers each time a buffer is freed (i.e., each time a packet received via one of node 12A's interfaces 102 is communicated from the buffer to all of that packet's recipient nodes and/or internal components). In response to the buffer being freed, the buffer allocation unit 108 may access the history data stored in history storage 110 (or temporarily generate history data based on current buffer usage) and compare the history for each virtual channel at each interface to determine how many buffers to allocate to each channel.

In other embodiments, the buffer allocation unit 108 may be configured to periodically determine whether to reallocate buffers based on the history data. For example, the buffer allocation unit 108 may reallocate buffers each time a certain number of total packets are transmitted (i.e., sent or received) by a particular interface or node. Alternatively, the buffer allocation unit 108 may reallocate buffers in response to a certain amount of time elapsing since the last reallocation.

Many embodiments may only reallocate buffers if doing so does not reduce the number of buffers allocated to a virtual channel below a minimum number. Thus, in some embodiments, if the minimum number of buffers is currently allocated to a particular virtual channel at a particular interface, the buffer allocation unit 108 may not reallocate any of the buffers currently allocated to that virtual channel at that interface, even if some of those buffers are currently free. The minimum number of buffers may be selected in order to guarantee a minimum bandwidth in each virtual channel.

In some embodiments, each time a buffer is freed, that buffer may be returned to a "pool" of unallocated buffers. Buffers currently included in the pool of unallocated buffers may be allocated by buffer allocation unit 108 at the next reallocation time. Alternatively, freed buffers may continue to remain allocated to the same virtual channel and/or interface until the next reallocation time.

Buffer allocation unit 108 may be configured to perform the operations involved in buffer reallocation and history generation as serial processes (as opposed to parallel processes) in some embodiments. For example, instead of performing the history data generation operations for each interface and/or each virtual channel in parallel, the buffer allocation unit 108 may be configured to perform each operation serially, which may in turn allow a less complex buffer allocation unit design (e.g., the buffer allocation unit 108 may include a single adder instead of including an adder for each virtual channel at each interface). Similarly, buffer reallocation tasks may be performed serially each time a buffer is freed. In other embodiments, buffer reallocation and/or history data generation tasks may be performed in parallel.

While the above description has focused on reallocating buffers between various virtual channels, note that such a buffer allocation unit 108 may also be used to reallocate buffers for various physical channels. Thus, in some embodiments, each interface may couple to multiple physical channels (as opposed to a single physical channel as shown in FIG. 7), and buffers may be allocated to the physical channels at each interface. History data for each physical channel at each interface may be generated (e.g., using one of the techniques described above). Note that in such an embodiment, several virtual channels may also be implemented and thus the buffer allocation scheme may reallocate buffers for both physical and virtual channels. As used herein, a "communication channel" may be either a physical channel or a virtual channel. Accordingly, a buffer reallocation scheme similar to those described above may be used to reallocate buffers among various communication channels in some embodiments.

Note that in some embodiments, buffers 106 may include various types of buffers. In one embodiment, buffers 106 may include command buffers and data buffers. Generally, the command buffers may store command packets to be routed (e.g., requests, responses, broadcasts, and posted requests). The data buffers may store data packets that are associated with a particular command. In some embodiments, command packets may be substantially smaller and may occur more frequently than data packets. Because of this size and frequency disparity, providing separate input buffers for command and data packets may allow buffer space to be used more efficiently. Thus, if a command packet that does not specify a data packet is received, no data packet buffer space may be allocated. Alternatively, if a command packet that does specify a data packet is received, both command packet buffer space and data packet buffer space may be allocated. To increase efficiency, a larger number of relatively smaller buffers may be provided for command packets, while fewer, larger buffers may be provided for data packets.

The buffer allocation unit 108 may be configured to maintain history for and reallocate either or both types of buffers. For example, in one embodiment, the buffer allocation unit may reallocate command buffers between each virtual channel and each interface but data buffers may be statically allocated. Furthermore, the buffer allocation unit 108 may perform reallocation independently for each type of buffer in some embodiments.

Note that in some embodiments, a static number of buffers 106 may be allocated to each interface, and these buffers may remain allocated to the same interface throughout operation of node 12A. In such embodiments, buffers may be dynamically reallocated between virtual channels but not between different interfaces. In other words, buffers allocated to a particular interface may be dynamically reallocated to different virtual channels at the same interface but may not be dynamically reallocated to a different interface.

In embodiments implementing a coupon-based flow control scheme, each interface may be configured to delay sending a buffer-free count in response to freeing a buffer until the buffer allocation unit 108 has determined whether that free buffer should be reallocated to another virtual channel and/or interface. Once a buffer-free count has been sent for a particular buffer, the buffer allocation unit 108 may be configured to not reallocate that buffer, even if that buffer is not currently in use.

Figure 8:
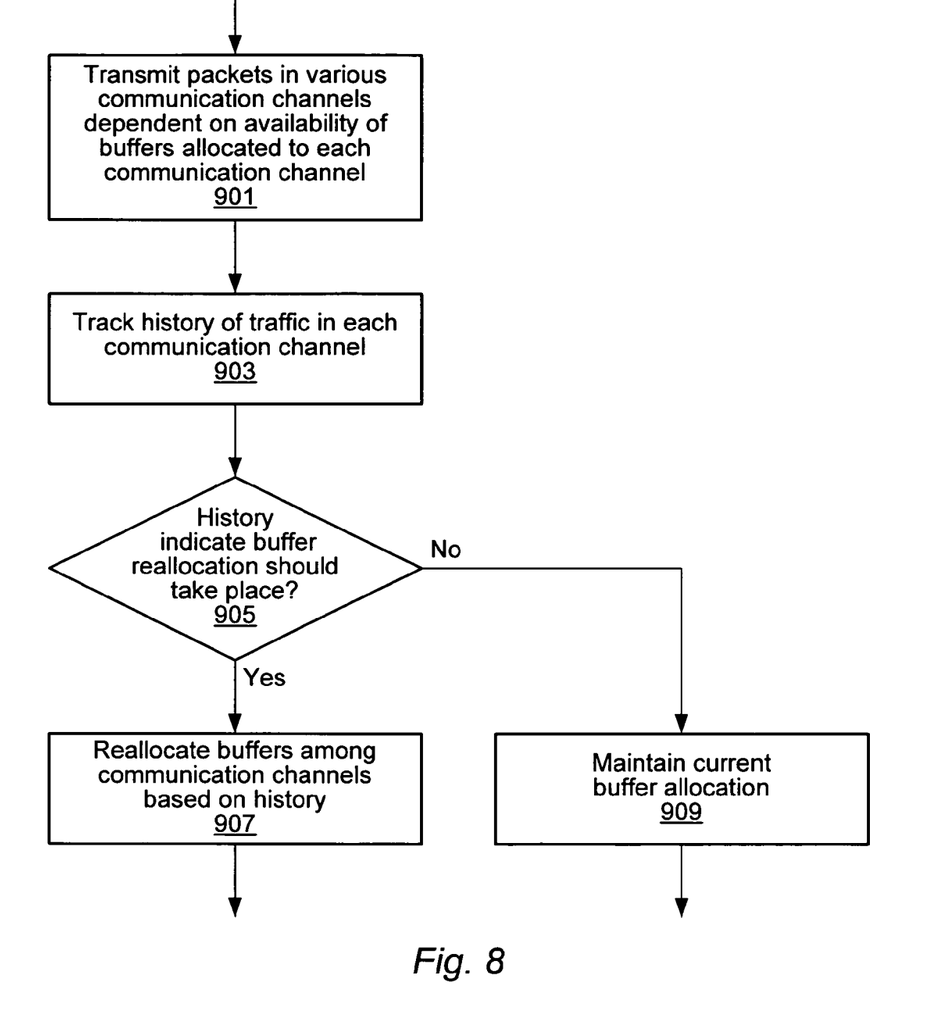
FIG. 8 is a flowchart of one embodiment of a method of reallocating buffers among communication channels.

FIG. 8 illustrates one embodiment of a method of reallocating buffers among communication channels based on a history of traffic in each communication channel. At 901, packets are transmitted in various communication channels dependent on the availability of buffers allocated to each communication channel. For example, receiving interfaces may be configured to assert flow control for a particular communication channel in order to halt packet transmission in that communication channel if the number of free buffers allocated to that communication channel at that interface is equal to and/or less than a minimum number. In embodiments implementing a coupon-based flow control scheme, receivers may send buffer-free counts to transmitters each time the receiver frees a buffer allocated to a particular communication channel. A transmitter may transmit a packet to the receiver in a particular communication channel in response to receiving a buffer-free count for that communication channel. Communication channels may include both physical and virtual channels.

At 903, the historical traffic in each communication channel is tracked. Tracking traffic history may involve occasionally comparing buffer usage for each communication channel. Tracking the traffic history of each communication channel may alternatively involve maintaining a count for each communication channel and incrementing the count each time a packet is transmitted in that communication channel. In some embodiments, counts may also be associated with interfaces. For example, if a receiving device has four interfaces that each send and receive packets in four communication channels, the receiving device may maintain 16 counts. In general, any system of tracking the traffic experienced in each communication channel relative to the traffic experienced in each other communication channel may be used. In some embodiments, tracking the traffic history may involve averaging counts recorded in several time periods, maintaining cumulative counts for each communication channel, and/or tracking both current traffic as it occurs and traffic experienced in a most recent time period. Note that a "time period" may be defined as a time in which a given number of packets are transmitted. For example, in one embodiment, a time period may be defined as a time in which 32 total packets, transmitted in any of three communication channels, are transmitted by a particular node.

If the history tracked at 903 indicates that buffers should be reallocated among the communication channels, as indicated at 905, buffers may be reallocated based on the history at 907. Otherwise, the current buffer allocation may be maintained, as shown at 909. The determination at 903 as to whether buffers should be reallocated may be made at various times. For example, in some embodiments, the determination may be made each time a buffer is freed (e.g., by an interface sending a packet previously stored in that buffer to all of that packet's destinations). In other embodiments, the determination may be made periodically or based on the total number of packets sent.

Reallocating the buffers based on the history may involve allocating free buffers to the various communication channels according to the relative levels of traffic experienced in each communication channel. Thus, a channel that previously experienced heavier traffic may be allocated more free buffers at 907 than a communication channel that experienced lighter traffic. The relative levels of traffic may be indicated by counts for each communication channel. In some embodiments, the relative levels of traffic may be indicated by ratios of the number of packets sent and/or received in each communication channel to the total number of packets sent and/or received in all communication channels among which buffers are allocated. In yet other embodiments, the relative levels of traffic may be indicated by averages of the counts recorded for each communication channel in several preceding time periods and/or by a comparison of the current traffic in each communication channel to the most recent traffic recorded in a preceding time period.

In some embodiments, the relative levels of traffic may also be tracked at each interface to an external or internal device that generates and/or consumes packets. Thus, reallocation may also reallocate buffers differently at each interface depending on the relative traffic experienced in each communication channel at that interface. Furthermore, in some embodiments, buffers may also be reallocated among interfaces.

Note that buffer reallocation at 907 may also depend on the number of free buffers available to be reallocated in some embodiments. For example, in embodiments that use a coupon-based flow control scheme, if an interface has already sent a buffer-free count in a particular communication channel based on the availability of a particular buffer, that buffer may not be reallocated to another communication channel.

Note that buffers are not dynamically reallocated within a particular node in response to receipt of a packet by that node. For example, in one embodiment, a first node may transmit packets in various communication channels to a second node dependent on availability of buffers included in the second node. At the time the first node transmits a packet in a given communication channel, a buffer within the second node is already allocated to that communication channel. The second node may dynamically reallocate one or more of its buffers (e.g., a buffer may be reallocated to one communication channel from another communication channel). The second node's dynamic reallocation is performed independently of the second node receiving a packet from the first node. Note that in some embodiments, dynamic buffer reallocation may be performed independently of traffic history.

Exemplary Network System

Figure 9:
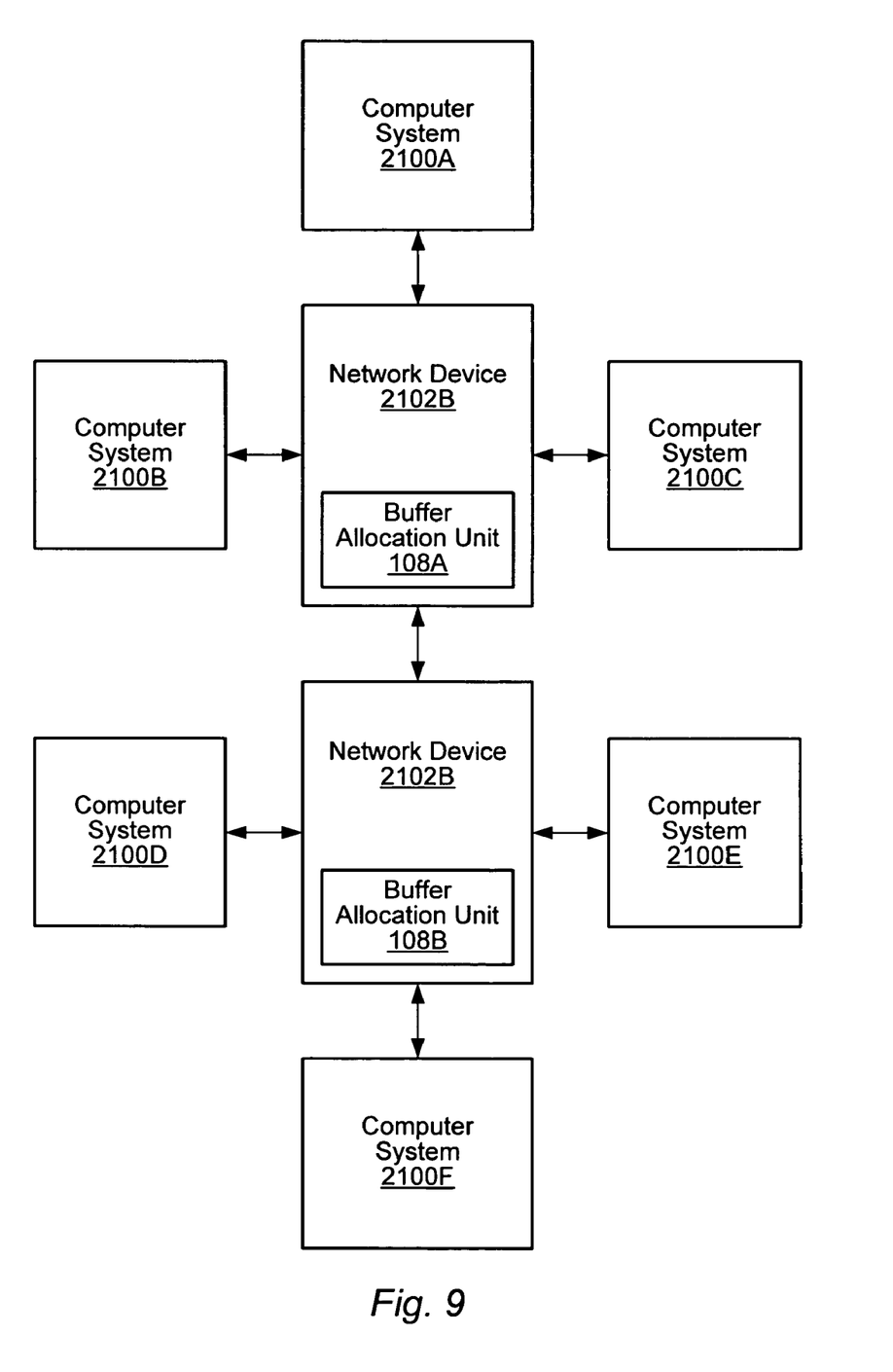
FIG. 9 is a block diagram of one embodiment of a network system that may use a reallocation technique similar to the one shown in FIG. 8.

Generally, embodiments of the dynamic buffer allocation mechanism described above may be used in other contexts in addition to the node shown in FIG. 7. For example, FIG. 9 shows a network of computer systems 2100A-C (or 2102B) coupled to a network device 2102A (or 2102B) that includes a router 54. In this embodiment, a router 54 may connect several different computer systems 2100A-C (or 2100D-F) in a network. Collectively, computer systems 2100A-F may be referred to as computer systems 2100. Each computer system 2100 may send and receive packets to the other computer systems via one or more of the network devices, much like the devices coupled to a node may send and receive packets to the other devices via one or more of the nodes. Furthermore, some computer systems may be connected to multiple network devices, allowing these computer systems to participate in multiple networks (not shown). Additionally, in some embodiments, a network device 2102A may be connected to another network device 2102B, allowing several computer systems to be connected.

Thus, like the node 12 in FIG. 7 included interfaces to other nodes, the network device 2102A may include interfaces to other network devices (e.g., other network devices 2102B) and/or to devices (e.g., computer systems 2100) that generate and consume packets. Each of the network device's interfaces may include an input port and an output port for sending and receiving packets to and from a computer system or another network device. The router 54 may be configured to route packets from an input port to an output port.

The router 54 may be configured in much the same way as the node shown in FIG. 7. The router 54 may include input buffers, and each input buffer may be configured to store packets received from a computer system 2100 or another network device 2102B. Traffic within the network may be subdivided into various communication channels (e.g., virtual and/or physical channels), and each interface's input buffers may include independent input buffers allocated to each communication channel. The router 54 may include a buffer allocation unit 108 configured to track a history of traffic in each communication channel and to dynamically reallocate buffers among the communication channels based on that history.

Note that in some embodiments, a packet may not be the smallest transferable entity in a system. For example, in systems that use wormhole switching, a flit, which is a portion of a packet, is the smallest transferable entity. In such embodiments, buffers may be sized to store flits instead of being sized to store entire packets. Various systems may be designed to use store and forward switching, wormhole switching, or virtual cut-through switching when communicating packets. Routing in various embodiments may be deterministic, adaptive, or some combination of the two.

Numerous variations and modifications will become apparent to those skilled in the art once the above disclosure is fully appreciated. It is intended that the following claims be interpreted to embrace all such variations and modifications.

What is claimed is:

1. An apparatus, comprising:
a plurality of interfaces each configured to transmit packets via a plurality of communication channels;
a plurality of buffers coupled to the plurality of interfaces and configured to store at least a portion of each packet, wherein a portion of the plurality of buffers are allocated to a communication channel;
a buffer allocation unit coupled to the plurality of interfaces and configured to generate history data indicative of relative traffic experienced in each of the communication channels, wherein the buffer allocation unit is configured to dynamically reallocate at least one of the portion of the plurality of buffers to an other communication channel in response to the history data.

2. The apparatus of claim 1, wherein the apparatus is comprised in a node in a distributed memory system, wherein each of a first portion of the interfaces are coupled to other nodes in the distributed memory system, and wherein each of a second portion of the interfaces are coupled to components included in the node.

3. The apparatus of claim 1, wherein the apparatus is comprised in a network device configured to couple a plurality of computer systems, wherein each of at least a portion of the plurality of interfaces couples to one of the computer systems.

4. The apparatus of claim 1, wherein the plurality of buffers include command buffers configured to store command packets.

5. The apparatus of claim 4, wherein the plurality of buffers include data buffers configured to store data packets, wherein the buffer allocation unit is configured to reallocate both the command buffers and the data buffers among the plurality of communication channels.

6. The apparatus of claim 1, wherein the plurality of communication channels include a plurality of virtual channels that are implemented over a same physical interconnect.

7. The apparatus of claim 1, wherein the plurality of communication channels include a plurality of physical channels.

8. The apparatus of claim 1, wherein each interface of the plurality of interfaces is configured to assert flow control in a particular one of the plurality of communication channels in response to a number of buffers allocated to that particular communication channel being less than a minimum number of buffers.

9. The apparatus of claim 1, wherein each interface is configured to send a buffer-free count for a particular communication channel in response to freeing a buffer currently allocated to that particular communication channel.

10. The apparatus of claim 9, wherein each interface is configured to delay sending the buffer-free count until the buffer allocation unit has determined whether to reallocate the buffer currently allocated to that particular communication channel.

11. The apparatus of claim 9, wherein the buffer allocation unit is configured to determine whether to reallocate a buffer dependent on the history data each time a buffer is freed.

12. The apparatus of claim 1, wherein the history data includes a plurality of counts, wherein each of the plurality of counts indicates a number of packets transmitted in a respective one of the plurality of communication channels during a current time period.

13. The apparatus of claim 12, wherein the history data includes a total count of packets transmitted in all of the plurality of communication channels during the current time period.

14. The apparatus of claim 13, wherein the buffer allocation unit is configured to freeze the plurality of counts in response to the total count reaching a maximum value.

15. The apparatus of claim 14, wherein the maximum value corresponds to a number of the plurality of buffers available to be reallocated among the plurality of communication channels.

16. The apparatus of claim 13, wherein the buffer allocation unit is configured to freeze the plurality of counts and the total count in response to one of the plurality of counts reaching a maximum value.

17. The apparatus of claim 12, wherein the history data includes a most recent count of packets transmitted in each communication channel during a prior time period.

18. The apparatus of claim 17, wherein the buffer allocation unit is configured to dynamically reallocate buffers in response to a difference between the count and the most recent count for each communication channel.

19. The apparatus of claim 1, wherein the history data includes data indicative of an average number of packets transmitted in each communication channel.

20. The apparatus of claim 1, wherein the history data includes data indicative of a number of packets transmitted in each communication channel at each of the plurality of interfaces.

21. The apparatus of claim 20, wherein the plurality of buffers are statically allocated among the plurality of interfaces, and wherein the buffer allocation unit is configured to dynamically reallocate buffers among the plurality of communication channels at each of the interfaces in response to the history data.

22. The apparatus of claim 20, wherein the buffer allocation unit is configured to dynamically reallocate buffers among the plurality of interfaces and among the plurality of communication channels.

23. A method, comprising:
transmitting packets in a plurality of communication channels dependent on availability of plurality of buffers allocated among the plurality of communication channels;
tracking a history of packet traffic in each of the plurality of communication channels; and
dependent on the history, dynamically reallocating one or more of the plurality of buffers from a first one of the plurality of communication channels to a second one of the plurality of communication channels.

24. The method of claim 23, wherein said transmitting comprises sending one of the packets from a first node in a distributed memory system to a second node in the distributed memory system.

25. The method of claim 23, wherein said transmitting comprises sending one of the packets from a network device to one of a plurality of computer systems coupled to the network device.

26. The method of claim 23, wherein the plurality of buffers include command buffers configured to store command packets.

27. The method of claim 26, wherein the plurality of buffers include data buffers configured to store data packets, wherein said dynamically reallocating comprises dynamically reallocating both the command buffers and the data buffers among the plurality of communication channels.

28. The method of claim 23, wherein said transmitting comprises sending the packets in a plurality of virtual channels that are implemented over a same physical interconnect.

29. The method of claim 23, wherein said transmitting comprises sending the packets in a plurality of different physical channels.

30. The method of claim 23, further comprising asserting flow control in a particular one of the plurality of communication channels in response to a number of buffers allocated to that particular communication channel being less than a minimum number of buffers.

31. The method of claim 23, further comprising sending a buffer-free count for a particular communication channel from a receiving device to a sending device in response to the receiving device freeing a buffer currently allocated to that particular communication channel.

32. The method of claim 31, further comprising delaying sending the buffer-free count until after said dynamically reallocating, wherein if said dynamically reallocating allocates the freed buffer to another communication channel, the buffer-free count is not sent.

33. The method of claim 31, wherein said dynamically reallocating is performed each time a buffer is freed.

34. The method of claim 23, wherein the history includes a plurality of counts, wherein said tracking comprises incrementing one of the plurality of counts each time a packet is transmitted in a respective one of the plurality of communication channels.

35. The method of claim 34, wherein the history includes a total count of packets transmitted in all of the plurality of communication channels, wherein said tracking comprises incrementing the total count each time a packet is transmitted in any of the plurality of communication channels.

36. The method of claim 35, wherein said tracking comprises freezing the plurality of counts in response to the total count of packets reaching a maximum value.

37. The method of claim 36, wherein the maximum value corresponds to a number of the plurality of buffers available to be reallocated among the plurality of communication channels.

38. The method of claim 35, wherein said tracking comprises freezing the plurality of counts and the total count in response to one of the plurality of counts reaching a maximum value.

39. The method of claim 34, wherein the history includes a most recent count of packets transmitted in each communication channel during a prior time period.

40. The method of claim 39, wherein said dynamically reallocating depends on a difference between the count and the most recent count for each communication channel.

41. The method of claim 23, wherein the history includes data indicative of an average number of packets transmitted in each communication channel.

42. The method of claim 23, wherein the history includes data indicative of a number of packets transmitted in each communication channel at each of a plurality of interfaces.

43. The method of claim 42, wherein the plurality of buffers are statically allocated among the plurality of interfaces, and wherein said dynamically reallocating comprises reallocating buffers among the plurality of communication channels at each of the interfaces in response to the history.

44. The method of claim 42, wherein said dynamically reallocating comprises reallocating buffers among the plurality of interfaces and among the plurality of communication channels.

45. A method, comprising:
a first node transmitting packets in a plurality of communication channels to a second node dependent on availability of a plurality of buffers included in the second node, wherein each of the plurality of buffers is allocated to one of the plurality of communication channels; and
the second node dynamically reallocating one or more of the plurality of buffers from a first one of the plurality of communication channels to a second one of the plurality of communication channels;
wherein said dynamically reallocating is performed independently of the second node receiving a packet from the first node.

46. The method of claim 45, wherein the first node and the second node are nodes within a distributed memory system.

47. The method of claim 45, wherein the first node includes a computer system and the second node includes a network device configured to route packets between a plurality of computer systems.

48. The method of claim 45, wherein the plurality of buffers include command buffers configured to store command packets.

49. The method of claim 48, wherein the plurality of buffers include data buffers configured to store data packets, wherein said dynamically reallocating comprises dynamically reallocating both the command buffers and the data buffers among the plurality of communication channels.

50. The method of claim 45, wherein said transmitting comprises sending the packets in a plurality of virtual channels that are implemented over a same physical interconnect.

51. The method of claim 45, wherein said transmitting comprises sending the packets in a plurality of different physical channels.

52. The method of claim 45, further comprising asserting flow control in a particular one of the plurality of communication channels in response to a number of the plurality of buffers allocated to that particular communication channel being less than a minimum number of buffers.

53. The method of claim 45, further comprising the second node sending a buffer-free count for a particular communication channel to the first node in response to the second node freeing a buffer currently allocated to that particular communication channel.

54. The method of claim 53, further comprising delaying sending the buffer-free count until after said dynamically reallocating, wherein if said dynamically reallocating allocates the freed buffer to another communication channel, the buffer-free count is not sent.

55. The method of claim 53, wherein said dynamically reallocating is performed each time a buffer is freed.

56. The method of claim 45, further comprising the second node tracking a history of traffic in each of the plurality of communication channels; wherein said dynamically reallocating is performed in response to said tracking.

57. The method of claim 56, wherein the history includes a plurality of counts, wherein said tracking comprises incrementing one of the plurality of counts each time a packet is transmitted in a respective one of the plurality of communication channels.

58. The method of claim 57, wherein the history includes a total count of packets transmitted in all of the plurality of communication channels, wherein said tracking comprises incrementing the total count each time a packet is transmitted in any of the plurality of communication channels.

59. The method of claim 58, wherein said tracking comprises freezing the plurality of counts of in response to the total count of packets reaching a maximum value.

60. The method of claim 59, wherein the maximum value corresponds to a number of the plurality of buffers available to be reallocated among the plurality of communication channels.

61. The method of claim 58, wherein said tracking comprises freezing the plurality of counts and the total count in response to one of the plurality of counts reaching a maximum value.

62. The method of claim 57, wherein the history includes a most recent count of packets transmitted in each communication channel during a prior time period.

63. The method of claim 62, wherein said dynamically reallocating depends on a difference between the count and the most recent count for each communication channel.

64. The method of claim 56, wherein the history includes data indicative of an average number of packets transmitted in each communication channel.

65. The method of claim 56, wherein the history includes data indicative of a number of packets transmitted in each communication channel at each of a plurality of interfaces.

66. The method of claim 65, wherein the plurality of buffers are statically allocated among the plurality of interfaces, and wherein said dynamically reallocating comprises reallocating buffers among the plurality of communication channels at each of the interfaces in response to the history.

67. The method of claim 65, wherein said dynamically reallocating comprises reallocating buffers among the plurality of interfaces and among the plurality of communication channels.

68. An apparatus, comprising:
 means for transmitting packets in a plurality of communication channels dependent on availability of plurality of buffers allocated among the plurality of communication channels;
 means for tracking a history of packet traffic in each of the plurality of communication channels; and
 means for dynamically reallocating one or more of the plurality of buffers dependent on the history.

\* \* \* \* \*